2,856,408
PRODUCTION OF MELAMINE

Fred L. Kelly and Billy E. Lloyd, Chesterfield County, Va., assignors to Allied Chemical Corporation, New York, N. Y., a corporation of New York No Drawing. Application May 9, 1956
Serial No. 583,628

16 Claims. (Cl. 260—249.7)

This invention is directed to a process for the production of melamine from calcium cyanate, ammonia and carbon dioxide.

We have discovered that by heating calcium cyanate in the presence of ammonia and carbon dioxide, melamine and calcium carbonate are formed. As is well known, ammonia, carbon dioxide and ammonium carbamate form a gas-solid system at low temperatures and a gaseous system at elevated temperatures, the amounts of the free gases and their solid compound present being dependent upon the temperature and pressure. At the elevated temperatures at which their reaction with calcium cyanate to form melamine is carried out in practicing our invention, so far as the reactants present are concerned, they are the same whether the ammonia and carbon dioxide are initially supplied combined as the solid ammonium carbamate or as free, gaseous ammonia and carbon dioxide. The equation for this reaction may be written:

(I) 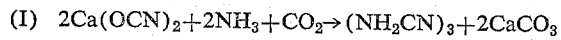
$2Ca(OCN)_2 + 2NH_3 + CO_2 \rightarrow (NH_2CN)_3 + 2CaCO_3$

It is also well known that at temperatures above 200° C. urea decomposes to form ammonia and carbon dioxide. While urea alone at high temperatures reacts to form melamine, we have found that when urea and calcium cyanate are heated, yields of melamine are obtained higher than may be ascribed to conversion of urea alone to melamine. The reaction is ascribed, at least in large part, to the decomposition of urea to form ammonia and carbon dioxide and reaction of the latter with the calcium cyanate. Accordingly, in carrying out the processes of our invention, calcium cyanate may be heated with urea to form melamine. The overall reaction between calcium cyanate and urea may be expressed by the following equation:

(II) 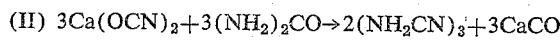
$3Ca(OCN)_2 + 3(NH_2)_2CO \rightarrow 2(NH_2CN)_3 + 3CaCO_3$

It is not intended, of course, to imply that there is a direct reaction between the urea and the calcium cyanate. Rather the mol proportions involved in the conversion of calcium cyanate to melamine in accordance with our invention are as indicated by the foregoing equation.

In operating in accordance with our invention, calcium cyanate is heated to at least 270° C. under pressure with ammonia and carbon dioxide or their equivalent, urea. The yields of melamine obtained vary with the time and temperature of heating, the pressure and the proportions of reactants employed. We have found it preferable to heat the reaction mixture to about 300° to about 400° C. under pressures of at least about 2000 p. s. i. g. for periods of about one-half to about two hours, with ammonia present in excess of one mol avilable ammonia per mol of calcium cyanate required by the equations given above.

The excess ammonia may be supplied either as free ammonia or the ammonia equivalent of ammonium carbamate, or urea; one mol of ammonium carbamate being the quivalent of two mols ammonia, and one mol urea being the quivalent of one mol ammonia. We have found it preferable to have present at least about one mol of excess ammonia per mol of calcium cyanate, i. e. a total of two mols ammonia for every one mol calcium cyanate. Increase of the excess ammonia from four to six mols per mol calcium cyanate was found to have little effect on the yield of melamine. Accordingly, while there is no theoretical upper limit to the excess ammonia which may be present, as a practical matter we prefer not to employ more than about four mols of excess ammonia per mol of calcium cyanate.

While we have found that ammonia alone together with calcium cyanate will react to form melamine, in the absence of carbon dioxide the yield of melamine is greatly reduced as compared with having not less than about 0.5 mol of free carbon dioxide or 0.5 mol equivalent of combined carbon dioxide in ammonium carbamate or urea present (i. e. 0.5 mol ammonium carbamate or 1 mol urea) for every one mol of calcium cyanate.

In general, best yields of melamine have been obtained with reaction pressures of about 4000 to 5000 p. s. i. g. and reaction times of 0.5 to one hour. Optimum yields of melamine were obtained at temperatures of about 350° C. for most other conditions of operation with respect to pressure, time, reactants employed, etc. When lower or higher temperatures were employed, we found the melamine yields generally were decreased although at lower temperatures, yields of ammelide and ammeline were increased. Accordingly, under circumstances such that these triazine products as well as melamine are desired, the lower temperatures may be employed advantageously. Lower pressures also were found to favor the formation of ammelide and ammeline.

When heated in the presence of water, calcium cyanate is hydrolyzed to cyanic acid. It follows, therefore, that in operating in accordance with our invention, the reaction mixtures containing calcium cyanate should be dry or, better yet, substantially anhydrous.

In carrying out our process, the pressure conditions described above need not be maintained throughout the heating of the initial reaction mixture. They represent the pressure conditions which should be attained during the course of reacting the initial materials under the other conditions for carrying out our process. Variation in pressure particularly occurs in an operation wherein an autoclave is charged with solid reactants, the autoclave is closed and is then heated up to the desired reaction temperatures. Under these circumstances, the total pressure at which the materials react is substantially that autogenously generated by the gases evolved by the reactants themselves in the closed space. These gases are practically all ammonia and carbon dioxide, with an inconsequential small amount of other gaseous materials such as water vapor and nitrogen. The total pressure is essentially the sum of the ammonia and carbon dioxide partial pressures generated in the autoclave, and the high pressures described above are only attained as the heating of the autoclave contents continues up to reaction temperatures. For a process carried out in this manner, the pressures attained are dependent upon the initial loading of the autoclave. Best yields of melamine are obtained with high loading densities, and in this type of operation we prefer to employ loading densities of above 0.3 kilogram of total charge per liter of internal volume of the autoclave. In operating a process in which solid calcium cyanate is supplied to a reactor, the desired ammonia and carbon dioxide pressures may be maintained by pumping these gases into the reactor.

We have further discovered that urea and calcium carbonate react when heated to form calcium cyanate. This reaction takes place readily when a mixture of urea and calcium carbonate is heated at temperatures of at least 135° C. under atmospheric or moderate pressures permitting the escape of ammonia, carbon dioxide and water. The reaction taking place may be represented by the following equation:

$$CaCO_3 + 2(NH_2)_2CO \rightarrow Ca(OCN)_2 + 2NH_3 + CO_2 + H_2O$$

This heating of the urea and calcium carbonate is prolonged until at least 30%, preferably at least 50%, of the total nitrogen in the reaction product is present as cyanate nitrogen and no more than 70%, preferably not more than 50%, is present as urea nitrogen. At the relatively low temperatures approaching 300° C., reaction of the urea and calcium carbonate to form calcium cyanamide is very slow. Accordingly, in producing calcium cyanate by this method for conversion to melamine, we prefer to employ a ratio of one mole calcium carbonate to every 2 to 3 mols urea, and to heat such a mixture at about 190° C. to about 250° C. under atmospheric pressure for about one to four hours.

The reaction product of the calcium carbonate and urea may contain varying amounts of ammonia, free or combined, unreacted calcium carbonate and urea, and biuret (a pyrolysis product of urea) in addition to the calcium cyanate. This reaction product together with ammonia and carbon dioxide or urea as needed for reaction of the calcium cyanate to form melamine, is heated under the conditions heretofore described.

Calcium carbonate and urea are both available in large quantities and are an especially economic source of starting materials for the production of melamine from calcium cyanate. This two-step process involving heating a mixture of urea and calcium carbonate to form a reaction product containing calcium cyanate, adjusting, when necessary to bring them within the limits defined above, the calcium cyanate-ammonia-carbon dioxide ratios of the mixture by addition of ammonia, ammonium carbamate, or urea, and heating the resulting mixture under the conditions promoting conversion of the calcium cyanate to melamine, is a preferred embodiment of our invention. As a further improvement in such a process, the amount of urea initially mixed with the calcium carbonate is such that after heating the mixture under conditions permitting escape of ammonia, carbon dioxide and water to form calcium cyanate, the reaction product contains at least one mol of unreacted urea for every one mol calcium cyanate present. Such reaction mixture is then heated at higher temperatures and under higher pressures heretofore described for reaction of the calcium cyanate and urea to form melamine.

The reaction product obtained by heating the calcium cyanate, ammonia and carbon dioxide or urea is essentially a mixture of melamine and water-insoluble materials, the latter being chiefly calcium carbonate. Relatively pure melamine is readily recovered by leaching or digesting the reaction product with hot water, separating the hot solution from insolubles, and then cooling the solution to precipitate or crystallize out the melamine. The mother liquor separated from the melamine may be used for the leaching or digestion of additional reaction product.

The following examples further supplement the foregoing description of our invention and represent specific embodiments thereof. In all of these examples, quantities of materials stated in "parts" are by weight.

*Examples 1–5.*—In carrying out these examples, calcium cyanate was prepared by mixing calcium chloride and silver cyanate in aqueous solution in the proportion of one mol calcium chloride to two mols of silver cyanate. The solution thus obtained was evaporated to dryness at a temperature below 80° C. to prevent hydrolysis of the calcium cyanate. Analysis of the resulting product showed it contained 16.05% total nitrogen, of which 12.7% was combined as calcium cyanate and 3.55% was ammonia nitrogen. It also contained calcium carbonate.

In a second preparation of calcium cyanate by this same procedure, the product was found to contain a total of 13.5% nitrogen, all combined as calcium cyanate. It also contained calcium carbonate.

In Examples 1–4, an autoclave was charged with a mixture of 63.2 parts of the first of the above products, equivalent to 35.6 parts of calcium cyanate, and 11.2 parts of solid ammonium carbamate. Both materials were finely ground and well mixed. The mixture was well chilled, and 14.0 parts anhydrous liquid ammonia added. The loading density was 0.34 kilogram per liter. The mol ratio of ammonium carbamate/ammonia/calcium cyanate was 1/1 1/2. This charge was sealed in the autoclave, heated to the desired reaction temperature and maintained at that temperature for the desired reaction period.

In Example 5, the procedure was identical except that the charge was made up using 59.4 parts of the calcium cyanate from the second of the above two preparations, equivalent to 35.6 parts of calcium cyanate, and the resulting loading density was 0.33 kilogram per liter.

The reaction conditions, yields of melamine from calcium cyanate and ratio (by weight) of total ammelide and ammeline formed to melamine are shown in the following table:

| Ex. | Temp., °C. | Time, mins. | Pressure, p. s. i. g. | Ammelide+ Ammeline Melamine | Mol Percent Yield Melamine | Percent Melamine in product |
|---|---|---|---|---|---|---|
| 1 | 350 | 120 | 4,175 | 0.92 | 21.0 | 7.2 |
| 2 | 350 | 30 | 3,525 | 0.76 | 23.4 | 7.9 |
| 3 | 300 | 120 | 2,150 | 0.77 | 31.4 | 9.7 |
| 4 | 300 | 30 | 2,150 | 5.36 | 12.0 | 3.5 |
| 5 | 300 | 150 | 2,975 | 0.35 | 36.0 | 11.7 |

*Examples 6–8.*—A mixture of finely divided dry urea and calcium carbonate, containing two mols urea per mol of calcium carbonate, was heated for four hours at 205° C. Analysis of a sample of this mixture showed it contained 19.17% total nitrogen, of which 3.20% was ammonia nitrogen, 2.68% was biuret nitrogen, 0.65% was urea nitrogen, and the remaining 12.64% was calcium cyanate nitrogen. In addition, this product contained some unreacted calcium carbonate. The procedure of above Examples 1–5 was followed in preparing a finely divided mixture of this calcium cyanate product and ammonium carbamate, charging the mixture to an autoclave and heating it in the closed autoclave to convert calcium cyanate to melamine.

The following table shows the reaction conditions and yields of melamine from calcium cyanate. Under the column heading "Charge ratio" the data show the mol ratios of ammonium carbamate (AC) and of ammonia (Am) for every one mol calcium cyanate in the charge. The ammonia present in the calcium cyanate product charged is included with the anhydrous liquid ammonia charged in computing the ratio of ammonia to calcium cyanate.

| Ex. | Temp., °C. | Time, mins. | Pressure, p. s. i. g. | Charge Ratio (AC) | Charge Ratio (Am) | Loading Density | Mol Percent Yield Melamine | Percent Melamine in product |
|---|---|---|---|---|---|---|---|---|
| 6 | 350 | 30 | 4,125 | 0.5 | 3.4 | 0.34 | 57.2 | 22.7 |
| 7 | 350 | 30 | 4,050 | 0.5 | 4.8 | 0.35 | 53.7 | 21.6 |
| 8 | 350 | 30 | 3,000 | 0 | 5.3 | 0.31 | 7.5 | 5.7 |

It is known that under certain conditions of heating urea or biuret at high temperatures and under high pressures, they are converted to melamine. These reactions may be expressed by the equations:

(III) $6(NH_2)_2CO \rightarrow (NH_2CN)_3 + 6NH_3 + 3CO_2$
(IV) $3NH(CONH_2)_2 \rightarrow (NH_2CN)_3 + 3NH_3 + 3CO_2$ In calculating the yields of melamine from calcium cyanate given in the above table, we have subtracted from the melamine formed the amount which theoretically might have been formed from the urea and biuret present in the calcium cyanate supplied to the process. The yields from the calcium cyanate are calculated on the basis of the remaining melamine. Accordingly, the yields given are minimum; and the actual yields from the calcium cyanate are in all probability higher than stated, by the difference between the amount of melamine actually formed from the urea or biuret and the amount which theoretically may have been formed.

*Examples 9–11.*—The procedure of Examples 6–8 were followed in the preparation of a charge to an autoclave except that finely divided urea was mixed with the finely divided crude calcium cyanate in place of the ammonium carbamate used in the previous examples. The following table shows the conditions under which this reaction mixture was heated, the mol ratios of urea and ammonia for every one mol calcium cyanate in the charge (Charge ratio), and the mol percent yields of melamine from calcium cyanate. The ratios of urea and of ammonia to calcium cyanate charged include the urea and the ammonia present in the crude calcium cyanate.

| Ex. | Temp., °C. | Time, mins. | Pressure, p. s. i. g. | Charge Ratio (Urea) | Charge Ratio (Am) | Loading Density | Mol Percent Yield Melamine | Percent Melamine in product |
|---|---|---|---|---|---|---|---|---|
| 9 | 350 | 120 | 3,625 | 1 | 5.0 | 0.36 | 53.6 | 24.6 |
| 10 | 380 | 60 | 6,475 | 1 | 8.5 | 0.42 | 58.8 | 29.6 |
| 11 | 385 | 60 | 4,675 | 1 | 2.2 | 0.54 | 60.5 | 25.6 |

Similarly as was done for Examples 6–8, in calculating the yields of melamine from calcium cyanate, we have first subtracted from the melamine in the reaction products the amount which could theoretically be formed from the biuret and from the excess urea present over the 1 to 1 mol ratio of urea to calcium cyanate required for formation of melamine from the calcium cyanate.

We claim:

1. The process for the production of melamine which comprises heating calcium cyanate to a temperature of at least about 270° C. in an atmosphere of ammonia and carbon dioxide under pressure substantially above atmospheric, and supplying to said atmosphere in contact with the heated calcium cyanate more than 1 mol ammonia and at least one-half mol carbon dioxide for every 1 mol of the calcium cyanate, thereby converting the calcium cyanate into melamine and calcium carbonate.

2. The process for the production of melamine which comprises heating under substantially atmospheric pressure a mixture of urea and calcium carbonate in the mol ratio of about 2 to 3 mols urea for every one mol calcium carbonate at temperatures in the range about 190° C. to about 250° C., to form a reaction product containing calcium cyanate, said heating being prolonged until at least 50% of the total nitrogen in the reaction product is present as cyanate nitrogen and not more than 50% is present as urea nitrogen, mixing the resulting product with urea and free ammonia in amounts such that the mixture contains about one mol urea and at least about one mol free ammonia for every one mol calcium cyanate, and heating the resulting mixture at about 300° to about 400° C. under pressure of at least about 2000 p. s. i. g., thereby converting the calcium cyanate to melamine and calcium carbonate.

3. The process for the production of melamine which comprises heating calcium cyanate at temperatures of at least about 270° C. in an atmosphere essentially composed of ammonia and carbon dioxide confined in a reaction vessel under pressures of at least about 2000 p. s. i. g., thereby converting the calcium cyanate to melamine and calcium carbonate.

4. The process of claim 3 in which there is available for reaction with the calcium cyanate in said vessel more than 1 mol ammonia and not less than 0.5 mol carbon dioxide per mol of calcium cyanate and the calcium cyanate is heated at temperatures of about 300° C. to about 400° C.

5. The process of claim 3 in which gaseous ammonia and carbon dioxide are introduced into the reaction vessel in which the calcium cyanate is heated.

6. The process of claim 5 in which the calcium cyanate is at temperatures of about 300° C. to about 400° C., and more than 1 mol ammonia and not less than about 0.5 mol carbon dioxide per mol of calcium cyanate are introduced into the reaction vessel.

7. The process of claim 6 in which at least about 2 mols ammonia for every 1 mol calcium cyanate are introduced into the reaction vessel.

8. The process of claim 3 in which ammonium carbamate is introduced into the reaction vessel, whereby ammonia and carbon dioxide are supplied to the atmosphere in which the calcium cyanate is heated, by pyrolysis of the ammonium carbamate.

9. The process of claim 8 in which no less than 0.5 mol ammonium carbamate per mol of calcium cyanate is introduced into the reaction vessel.

10. The process of claim 8 in which at least about 1 mol of ammonium carbamate per mol of calcium cyanate is introduced into the reaction vessel.

11. The process of claim 3 in which urea is introduced into the reaction vessel, whereby ammonia and carbon dioxide are supplied to the atmosphere in which the calcium cyanate is heated, by pyrolysis of the urea.

12. The process of claim 11 in which not less than 1 mol urea for every 1 mol calcium cyanate is introduced into the reaction vessel.

13. The process of claim 12 in which free ammonia is also introduced into the reaction vessel in addition to the urea and calcium cyanate.

14. The process for the production of melamine which comprises heating a mixture of urea and calcium carbonate at temperatures of at least 135° C., under pressures permitting the escape of ammonia, carbon dioxide and water from the reaction mixture, thereby producing a reaction product containing calcium cyanate, said heating being prolonged until at least 30% of the total nitrogen in the reaction product is present as cyanate nitrogen and not more than 70% is present as urea nitrogen, and thereafter heating said reaction product at temperatures of at least about 270° C. in an atmosphere essentially composed of ammonia and carbon dioxide confined in a reaction vessel under pressures of at least about 2000 p. s. i. g., thereby converting the calcium cyanate to melamine and calcium carbonate.

15. The process for the production of melamine which comprises heating a mixture of urea and calcium carbonate at temperatures of at least 135° C., under pressures permitting the escape of ammonia, carbon dioxide and water from the reaction mixture, thereby producing a reaction product containing calcium cyanate, said heating being prolonged until at least 50% of the total nitrogen in the reaction product is present as cyanate nitrogen, and thereafter heating said reaction product at temperatures of at least about 270° C. in an atmosphere essentially composed of ammonia and carbon dioxide confined in a reaction vessel under pressures of at least about 2000 p. s. i. g. and introducing gaseous ammonia and carbon dioxide into said reaction vessel wherein said reaction product is being heated, thereby converting the calcium cyanate to melamine and calcium carbonate.

16. The process for the production of melamine which comprises heating under substantially atmospheric pressure a mixture of urea and calcium carbonate in the mol ratio of about 2 to 3 mols urea for every one mol calcium carbonate at temperatures in the range about 190° C. to about 250° C., under pressures permitting the escape of ammonia, carbon dioxide and water from the reaction mixture, thereby producing a reaction product containing calcium cyanate, said heating being prolonged until at least 50% of the total nitrogen in the reaction product is present as cyanate nitrogen and not more than 50% is present as urea nitrogen, and thereafter heating said reaction product at temperatures of about 300° C. to about 400° C. in an atmosphere essentially composed of ammonia and carbon dioxide confined in a reaction vessel under pressures of at least about 2000 p. s. i. g. and introducing into said reaction vessel in which said reaction product is being heated, gaseous ammonia and carbon dioxide in amount such that a total of at least 1 mol of ammonia plus urea and not less than 0.5 mol total of urea plus carbon dioxide is supplied to said reaction vessel for every 1 mol of calcium cyanate in said reaction product heated therein, thereby converting the calcium cyanate to melamine and calcium carbonate.

References Cited in the file of this patent

UNITED STATES PATENTS

| | | |
|---|---|---|
| 1,241,919 | Bucher | Oct. 2, 1917 |
| 1,241,920 | Bucher | Oct. 2, 1917 |
| 2,546,551 | Lento et al. | Mar. 27, 1951 |

FOREIGN PATENTS

| | | |
|---|---|---|
| 124,164 | Australia | Apr. 30, 1947 |
| 1,087,035 | France | February 1955 |
| 583,504 | Great Britain | Dec. 19, 1946 |
| 639,962 | Great Britain | July 12, 1950 |

OTHER REFERENCES

Diario Oficial, page 1023 (May 14, 1945), Brazil, Secão III.

Williams et al: J. Am. Chem. Soc., vol. 74, 2407 (1952).